United States Patent
Morales Serrano

(10) Patent No.: US 6,888,331 B2
(45) Date of Patent: May 3, 2005

(54) COMMUTATION OF SENSORLESS DIRECT-CURRENT MOTORS

(75) Inventor: Francisco Morales Serrano, Aachen (DE)

(73) Assignee: Koninklijke Philips Electronics N.V., Eindhoven (NL)

(*) Notice: Subject to any disclaimer, the term of this patent is extended or adjusted under 35 U.S.C. 154(b) by 56 days.

(21) Appl. No.: 10/277,537

(22) Filed: Oct. 22, 2002

(65) Prior Publication Data
US 2003/0173855 A1 Sep. 18, 2003

(30) Foreign Application Priority Data
Oct. 25, 2001 (EP) .............................. 01125291

(51) Int. Cl.[7] .............................................. H01R 39/46
(52) U.S. Cl. ...................... 318/439; 388/809; 318/636
(58) Field of Search ................................ 318/439, 636, 318/629, 600, 569, 254, 138; 388/809, 814, 815, 928.1; 320/162

(56) References Cited

U.S. PATENT DOCUMENTS 5,724,037 A * 3/1998 Lee ............................ 341/143
5,835,043 A * 11/1998 Tsuchida et al. ............ 341/143
5,901,176 A * 5/1999 Lewison ..................... 375/238
5,974,089 A * 10/1999 Tripathi et al. ............. 375/247
2002/0084772 A1 * 7/2002 Ruha et al. ................. 320/162

FOREIGN PATENT DOCUMENTS

DE         3710509         11/1988         ......... H02K/29/14

OTHER PUBLICATIONS

Patent Abstracts of Japan, Tawara Kazuo: "Driving Of Brushless DC Motor" Publication No. 09154294, Oct. 6, 1997, Application No. 07310288, Nov. 29, 1995.

Patent Abstracts of Japan, Ueda Kazuhiko: "Sensorless Drive Device And Method Of brushless DC Motor Using Digital Phase Synchronization Loop" Publication No. 2001061291, Jun. 3, 2001, Application No. 11235524, Aug. 23, 1999.

* cited by examiner

Primary Examiner—Karen Masih
(74) Attorney, Agent, or Firm—Michael E. Belk

(57) ABSTRACT

The invention relates to a sensorless commutation of a direct-current motor. To allow an exact, easy to design, flexible, and highly integratable circuit arrangement for commuting motor devices, analogue phase detectors are replaced by digital devices, in particular Sigma-Delta-modulators, which oversample the induced voltages of coils of said motor.

20 Claims, 2 Drawing Sheets

COMMUTATION OF SENSORLESS DIRECT-CURRENT MOTORS

The invention relates to a circuit arrangement for sensorless commutation of a direct-current motor (dc motor), in particular a brush-less dc motor, comprising an amplifier to provide at least two coils of a rotor or a stator of said motor with supply voltages for driving said motor, a back electromotive force (BEMF) amplifier to output induced voltages of said coils of said motor, respectively, a multiplexer to output alternatively one of said induced voltages, and a state machine connected to said amplifier and said multiplexer to determine, depending on its current state, which of said at least two coils is provided with said supply voltages by said amplifier and which of said induced voltages is selected by said multiplexer.

The invention further relates to a process to commute a sensorless direct-current motor (dc motor), in particular a brush-less dc motor, comprising the steps of providing at least two coils of a rotor or stator of said motor with supply voltages, respectively, for driving said motor, tapping induced voltages of at least two coils of said motor, respectively, and selecting at least one of said induced voltages.

In addition the invention relates to the use of a described circuit arrangement or a described process.

To commute sensorless direct-current motors is well known in practice. In particular, document DE 37 10 509 C1 discloses a process for commuting a direct-current motor. According to the disclosure of this document, a permanent magnetised rotor and a thereto assigned stator with at least two coils is provided. Said coils may be connected to a power supply, which provides the stator with supply voltages, by which the motor is driven. Said permanent magnetised rotor induces voltages in said coils of said stator while said coils are not connected to said power supply. To determine, in which state a rotor is, said induced voltages are used. By comparing said induced voltages with reference voltages, it is possible to determine in which state a rotor is. Depending on the determined state of said rotor, different supply voltages are applied to said coils.

To determine, in which state a rotor is, it is known to use Phase-Locked Loops (PLL). A Phase-Locked Loop comprises a phase detector, a loop-filter and a voltage-controlled oscillator (VCO). It is known to implement these components in an analogue form. A shortcoming of analogue components is that they are difficult to configure, that the size of such a circuit arrangement is big, that commutation is not exact, and that they are not flexible.

It is an object of the invention to provide an exact commutation along with a high integration degree of components.

To enable a high integration degree of the circuit arrangement, a digitising circuit to digitise said output of said multiplexer, to digitally process said output, and to provide said state machine with a control signal enabling said state machine to correctly determine the state of said motor is provided according to the invention. Said digitising circuit digitises said output of said multiplexer. This output is an induced voltage that may be used for correctly determining the state of the rotor. Depending on the state of the state machine, the multiplexer selects which induced voltage is used for further processing.

The coils may be arranged within the rotor or the stator. A circuit arrangement in star-, triangle- or zig-zag-formation of the coils is possible. A centre tap in a star-formation of said coils is helpful to measure the induced voltage in each coil. At least one of said coils is not driven by said power supply and thus an induced voltage appears at the terminals of said coil. This voltage is induced by a revolving magnetic field caused by said permanent magnets. The induced voltages may be used to determine the position of the rotor in relation to the stator.

By digitising said output of said multiplexer, it becomes possible to digitally process said induced voltages. By digitally processing said induced voltages, a commutation is easy to adjust. Also the components used for such a circuit arrangement can be highly integrated.

Additionally, the design of such a circuit arrangement is easier. After digitally processing said output, a control signal is provided, by which said state machine is controlled. According to said control signal, said state machine switches between its states and thus provides said multiplexer with information about which terminal is to be selected to measure said induced voltage.

Also, the amplifier is provided with information, which coil has to be supplied with said supply voltage. Said amplifier receives the information from said state machine, in which order the supply voltage has to be applied to said coils.

By using a circuit arrangement according to an embodiment of the invention an easy circuit structure can be used. Oversampling allows to adjust a signal to noise ratio (SNR) according to device specifications. The output of said Sigma-Delta modulator is a bit-stream. Said bit-stream represents digitally said output of said multiplexer and thus said induced voltage of at least one of said coils.

In most cases, the bit rate of the output of a Sigma-Delta-modulator is very high. at the Sigma-Delta-modulator operates at a high oversampling rate. In these cases, it is appropriate to provide a circuit arrangement according to an embodiment of the invention A decimation filter may convert said output of said Sigma-Delta-modulator into a signal with a lower rate. Also, the transfer function of such a circuit arrangement may be adjusted.

To provide said state machine with a control signal, a circuit arrangement according to an embodiment of the invention is provided. Said voltage-controlled oscillator (VCO) outputs an oscillation at a determined frequency. This frequency depends on the state of the rotor. The state machine switches between its states, driven by the output of said voltage-controlled oscillator, correctly.

A digital voltage-controlled oscillator according to an embodiment of the invention is also proposed. The output of said decimation filter may be an n-bit wide digital word, representing the digital output of said Sigma-Delta modulator, which is a bit-stream, at a decreased output frequency. In this case, the voltage-controlled oscillator outputs an oscillation depending on its input. By providing a digital voltage-controlled oscillator, the integration degree of said circuit arrangement may be higher. Also the design of said circuit arrangement is easier, as only digital components are used.

According to specifications on how exact a commutation has to work, quantization noise has to be reduced. To allow this, a circuit arrangement according to claim 6 is provided.

A process of digitising said induced voltage by oversampling, and digitally processing said digitised voltage to provide a control signal for correctly selecting said tapping of said induced voltages and for correctly providing said at least two coils with said supply voltages is another aspect of the invention.

A process according to claim 8 is also preferred. Thus, the output of a sensorless dc motor is processed mostly digitally, whereby the exactness of a commutation is increased, and kept flexible.

It is yet another aspect of the invention to use a pre-described circuit arrangement, or a predescribed process in mass storage devices, in hard disc drives, and in optical storage devices.

These and other aspects of the invention will become apparent from and elucidated with reference to the embodiment described hereinafter.

Figure 1:
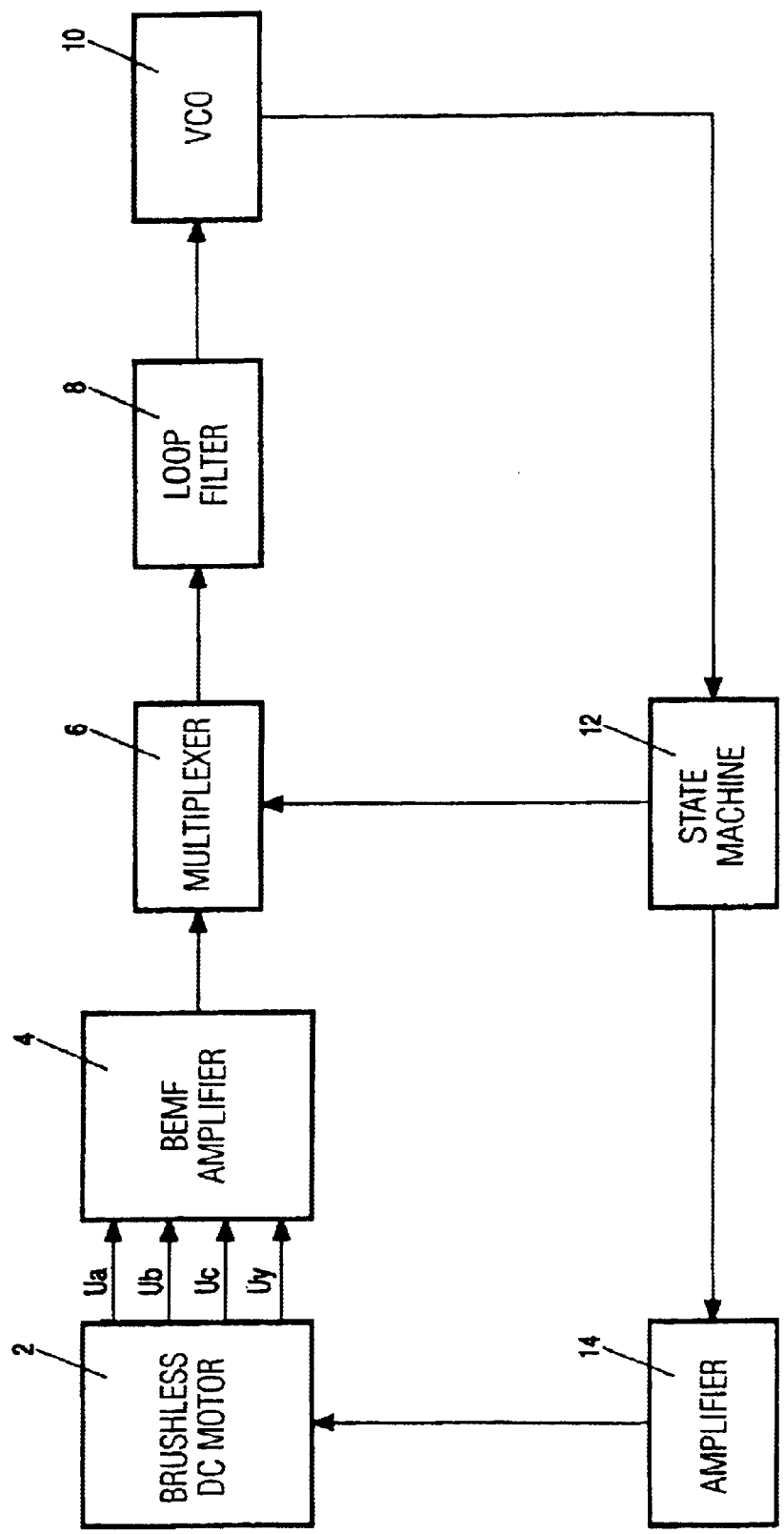
FIG. 1 depicts diagrammatically a process according to prior art.

In FIG. 1, a brushless direct-current motor (BLDC) 2, a back electromotive force (BEMF) amplifier 4, a multiplexer 6, a loop filter 8, a voltage-controlled oscillator 10, a state machine 12, and an amplifier 14 is depicted.

Said BLDC motor 2 provides said BEMF amplifier 4 with terminal voltages Ua, Ub, Uc and Uy. These terminal voltages Ua, Ub, Uc and Uy can be measured at one of three coil taps of said motor or the centre tap, respectively. Ua, Ub, Uc represent the potential of the coil taps of said motor and Uy is the potential of said centre tap of said motor 2.

According to the state of said state machine 12, a difference between one of said terminal voltages Ua, Ub, Uc and the centre potential Uy is calculated. The differences represent the induced voltage in the corresponding coils. The voltage is induced in said coils by the rotation of the rotor of said motor 2. When a coil is not fed with supply voltages, the induced voltage may be calculated and used for calculating the position of the rotor.

Said BEMF amplifier 4 amplifies said induced voltages. Said amplified induced voltages are provided to said multiplexer 6. Said multiplexer 6 selects one of said induced voltages according to a control signal provided by said state machine 12. The output of said multiplexer 6 is one of said induced voltages.

Said loop filter 8 filters said voltages and provides a filtered representation of said voltage to said voltage-controlled oscillator 10. The output of said voltage-controlled oscillator 10 is an oscillation which depends on the voltage which was input to said voltage-controlled oscillator 10. By providing an oscillation to said state machine 12, said state machine 12 changes its state according to the output frequency of said voltage-controlled oscillator 10.

Each state of said state machine 12 contains information, which induced voltage has to be selected by said multiplexer 6. Depending on the state of said state machine 12, differences between terminal voltages Ua, Ub, Uc and centre potential Uy are calculated, representing the induced voltages. Also, each state of said state machine 12 provides information to said amplifier 14, which of said coils of said motor 2 has to be driven with a supply voltage. As said state machine switches in a controlled manner, said multiplexer 6 always selects the correct induced voltage. Also, said state machine 12 ensures that said amplifier 14 always provides the correct coils with corresponding supply voltages. The shortcoming of such a circuit arrangement is that the design is difficult, and that with analogue devices a high integration degree is not possible.

Figure 2:
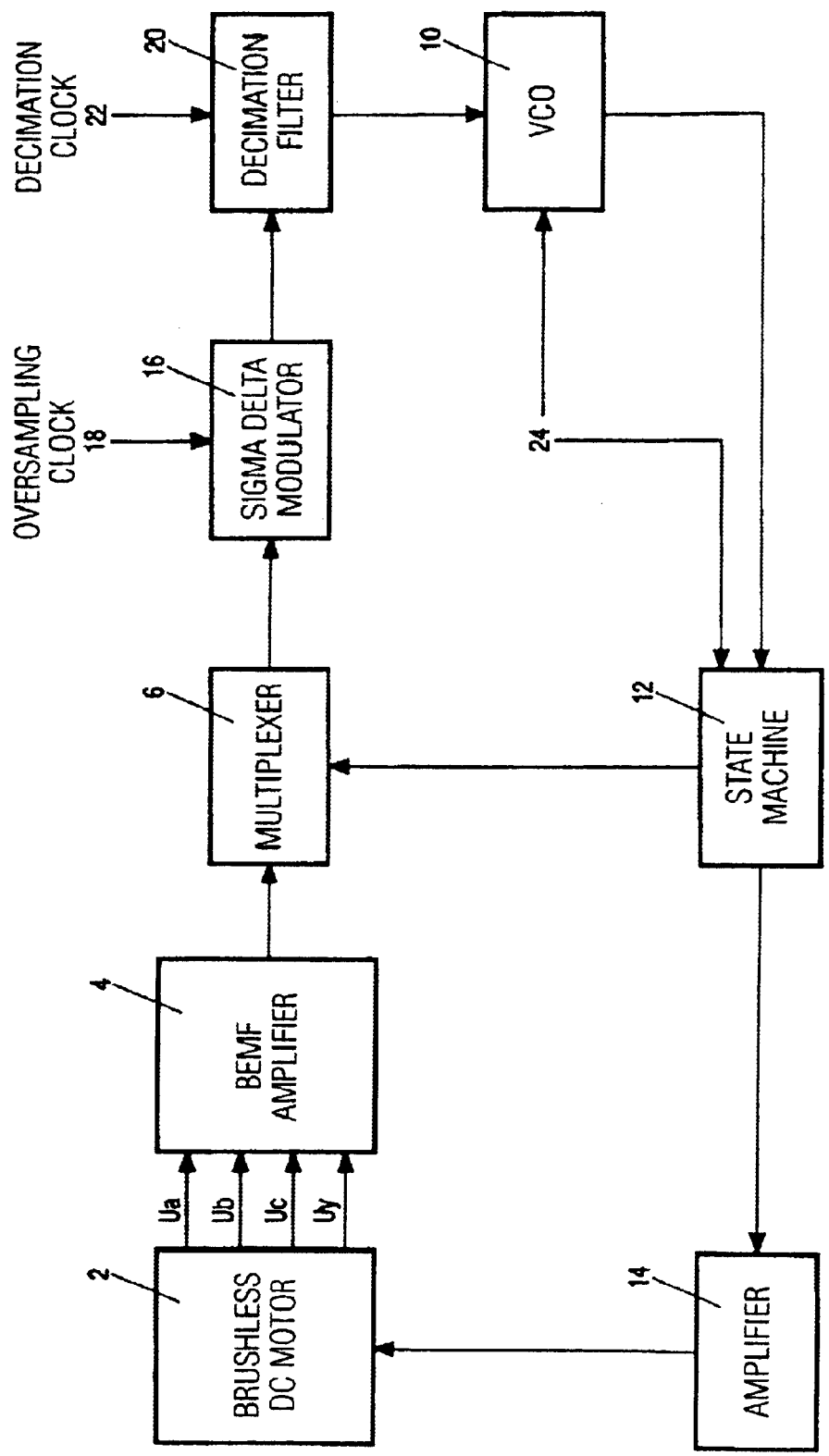
FIG. 2 depicts diagrammatically a process according to the invention.

A circuit arrangement, such as depicted diagrammatically in FIG. 2, overcomes these problems. The elements depicted in FIG. 2 correspond to the elements depicted in FIG. 1. Different to FIG. 1, in FIG. 2 said loop filter 8 is substituted by a Sigma-Delta-modulator 16 and a decimation filter 20.

Said Sigma-Delta-modulator 16 is fed by an oversampling clock 18. Said decimation filter 20 is fed by a decimation clock 22. Said voltage-controlled oscillator 10 and said state machine 12 are fed by a main clock source 24.

The output of said multiplexer 6 is the same as described in FIG. 1. The Sigma-Delta-modulator 16 oversamples its input according to an oversampling ratio provided by said oversampling clock 18. The output of said Sigma-Delta-modulator 16 is a bit-stream representing the output of said multiplexer 6 digitally.

Said decimation filter 20 decimates said bit-stream according to said decimation clock 22 and a given transfer function. The output of said decimation filter 20 is an n-bit wide digital signal. According to the output of said decimation filter 20, said voltage-controlled oscillator 10 provides an oscillation to said state machine 12.

Said voltage-controlled oscillator 10 may also be designed in digital form. In this case, an output of said decimation filter 20 may be digital signal. According to the output of said decimation filter 20, said voltage-controlled oscillator 10 generates an oscillation of a certain frequency, and provides it to said state machine 12.

Again, said state machine 12 provides said multiplexer 6, and said amplifier 14 with information, which induced voltage to select, and which coils to provide with supply voltages.

The advantage of the described arrangement is that it is easy to design, highly integratable, flexible and exact. The arrangement can be easily adjusted to system specifications concerning signal/noise ratio (SNR), or different signal forms provided by said amplifier 14 to said motor 2.

What is claimed is:

1. Circuit arrangement for sensorless commutation of a brush-less direct-current motor (dc motor), comprising:
    an amplifier to provide at least two coils of a rotor or a stator of said motor with supply voltages for driving said motor,
    a back electromotive force (BEMF) amplifier to output induced voltages of said coils of said motor, respectively,
    a multiplexer to output alternatively one of said induced voltages, and
    a state machine connected to said amplifier and said multiplexer to determine, depending on its current state, which of said at least two coils is provided with said supply voltages by said amplifier and which of said induced voltages is selected by said multiplexer,
    characterized in that a digitizing circuit is provided to digitize said output of said multiplexer, to digitally process said output, and to provide said state machine with a control signal enabling said state machine to correctly determine the state of said motor.

2. Circuit arrangement according to claim 1, characterized in that said digitizing circuit comprises a Sigma-Delta modulator to oversample said output of said multiplexer, and to output a bit-stream digitally representing said output of said multiplexer.

3. Circuit arrangement according to claim 2, characterized in that said digitizing circuit comprises a decimation filter to digitally filter said bit-stream of said Sigma-Delta modulator.

4. Circuit arrangement according to claim 1, characterized in that a voltage-controlled oscillator provides said state machine with said control signal depending on said output of said digitizing circuit.

5. Circuit arrangement according to claim 4, characterized in that said voltage-controlled oscillator digitally processes an output of said decimation filter.

6. Circuit arrangement according to claim 2, characterized in that said Sigma-Delta modulator is of an order larger than one.

7. Process to commutate a sensorless, brush-less, direct-current motor (dc motor), in a circuit arrangement, comprising the following steps:

providing at least two coils of a rotor or stator of said motor with supply voltages, respectively, for driving said motor, tapping induced voltages of at least two coils of said motor, respectively, and selecting at least one of said induced voltages, characterized by digitizing said induced voltage by oversampling, and digitally processing said digitized voltage to provide a control signal for correctly selecting said tapping of said induced voltages and for correctly providing said at least two coils with said supply voltages.

8. Process according to claim 7, characterized by:

providing a bit-stream corresponding to said induced voltages, decimating said bit-stream according to decimation rules, converting said decimated bit-stream into an oscillation, and depending on said oscillation selecting said tapping of induced voltages, and providing said at least two coils with said supply voltages.

9. The process according to claim 7, characterized in that said digitizing further comprises a Sigma-Delta modulation to oversample said selected voltage, and outputting a bit-stream digitally representing said output of said multiplexer.

10. The process according to claim 9, characterized in that said digitizing further comprises decimating filtering to digitally filter said bit-stream of said Sigma-Delta modulation.

11. The process according to claim 10, characterized in that the digitizing further comprising a voltage-controlled oscillator providing a state machine with said control signal.

12. The process according to claim 11, characterized in that said voltage-controlled oscillator digitally processes an output of said decimation filter.

13. The process according to claim 12, characterized in that said Sigma-Delta modulator is of an order larger than one.

14. Use of a circuit arrangement for sensorless commutation of a direct-current motor (dc motor), a brush-less dc motor, comprising:

an amplifier to provide at least two coils of a rotor or a stator of said motor with supply voltages for driving said motor, a back electromotive force (BEMF) amplifier to output induced voltages of said coils of said motor, respectively, a multiplexer to output alternatively one of said induced voltages, and a state machine connected to said amplifier and said multiplexer to determine, depending on its current state, which of said at least two coils is provided with said supply voltages by said amplifier and which of said induced voltages is selected by said multiplexer.

characterized in that a digitizing circuit is provided to digitize said output of said multiplexer, to digitally process said output, and to provide said state machine with a control signal enabling said state machine to correctly determine the state of said motor or a process in mass storage devices, in hard disc drives, and in optical storage devices.

15. The use of a circuit arrangement according to claim 14, characterized in that said digitizing circuit comprises a Sigma-Delta modulator to oversample said output of said multiplexer, and to output a bit-stream digitally representing said output of said multiplexer.

16. The use of a circuit arrangement according to claim 15, characterized in that said digitizing circuit comprises a decimation filter to digitally filter said bit-stream of said Sigma-Delta modulator.

17. The use of a circuit arrangement according to claim 14, characterized in that a voltage-controlled oscillator provides said state machine with said control signal depending on said output of said digitizing circuit.

18. The use of a circuit arrangement according to claim 17, characterized in that said voltage-controlled oscillator digitally processes an output of said decimation filter.

19. The use of a circuit arrangement according to claim 15, characterized in that said Sigma-Delta modulator is of an order larger than one.

20. The use of a circuit arrangement according to claim 15, characterized by:

the bit-stream corresponds to said induced voltages, the bit-stream is decimated according to decimation rules, the decimated bit-stream is converted into an oscillation, and the oscillation selects tapping of induced voltages, and provides said at least two coils with said supply voltages.

* * * * *